INVENTOR.
CARL THUMIM

BY Ostrolenk & Faber
ATTORNEYS

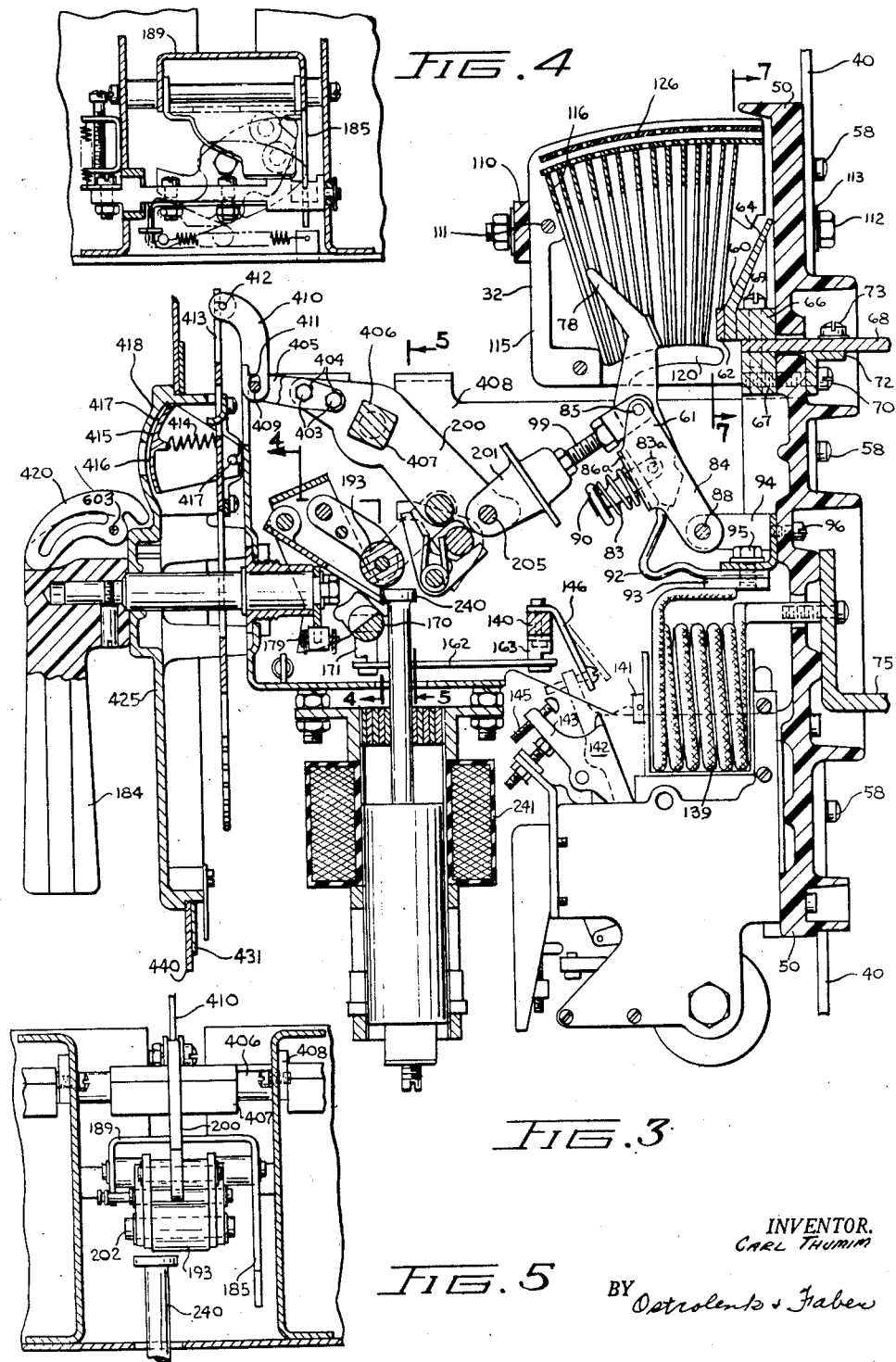

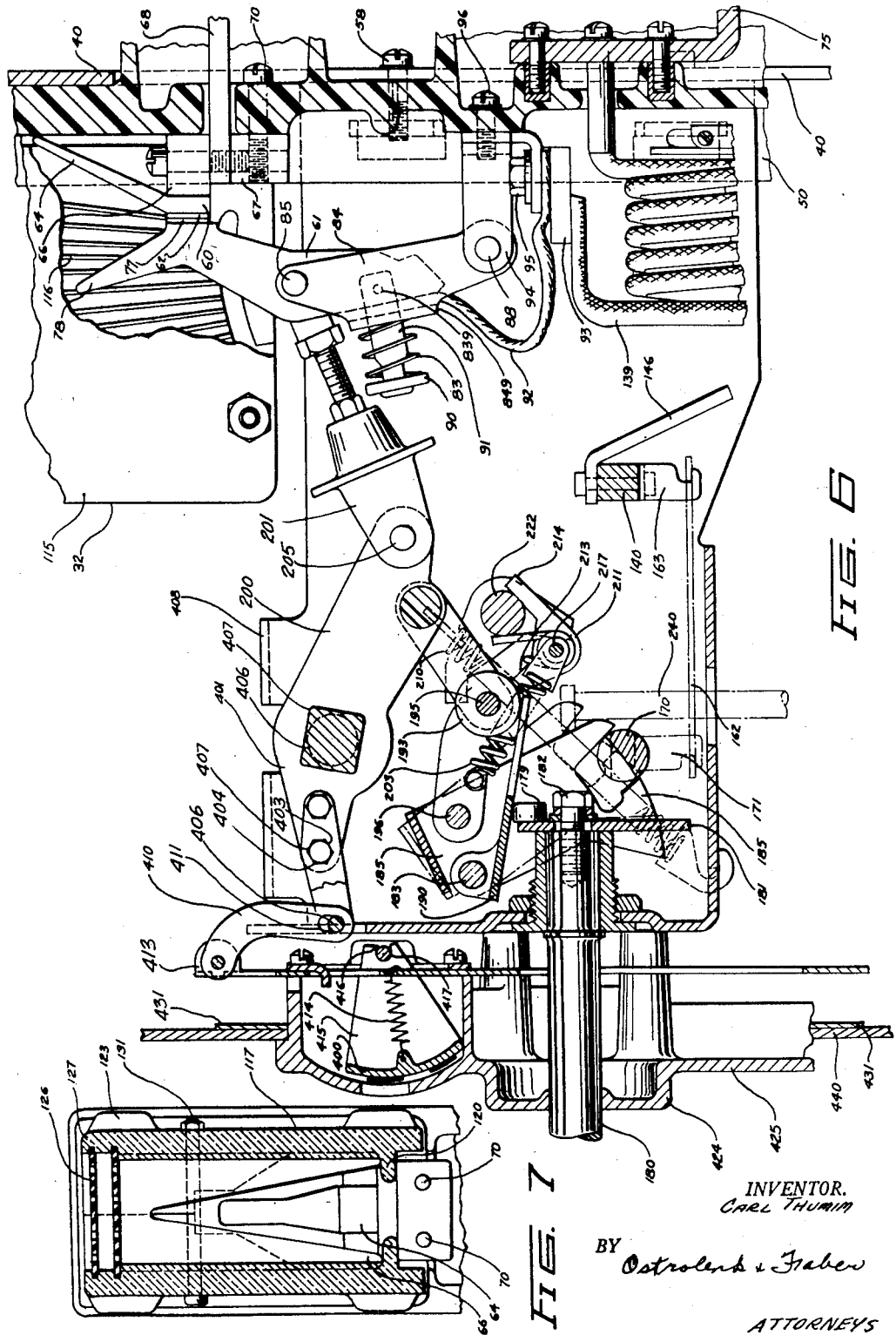

INVENTOR.
CARL THUMIM

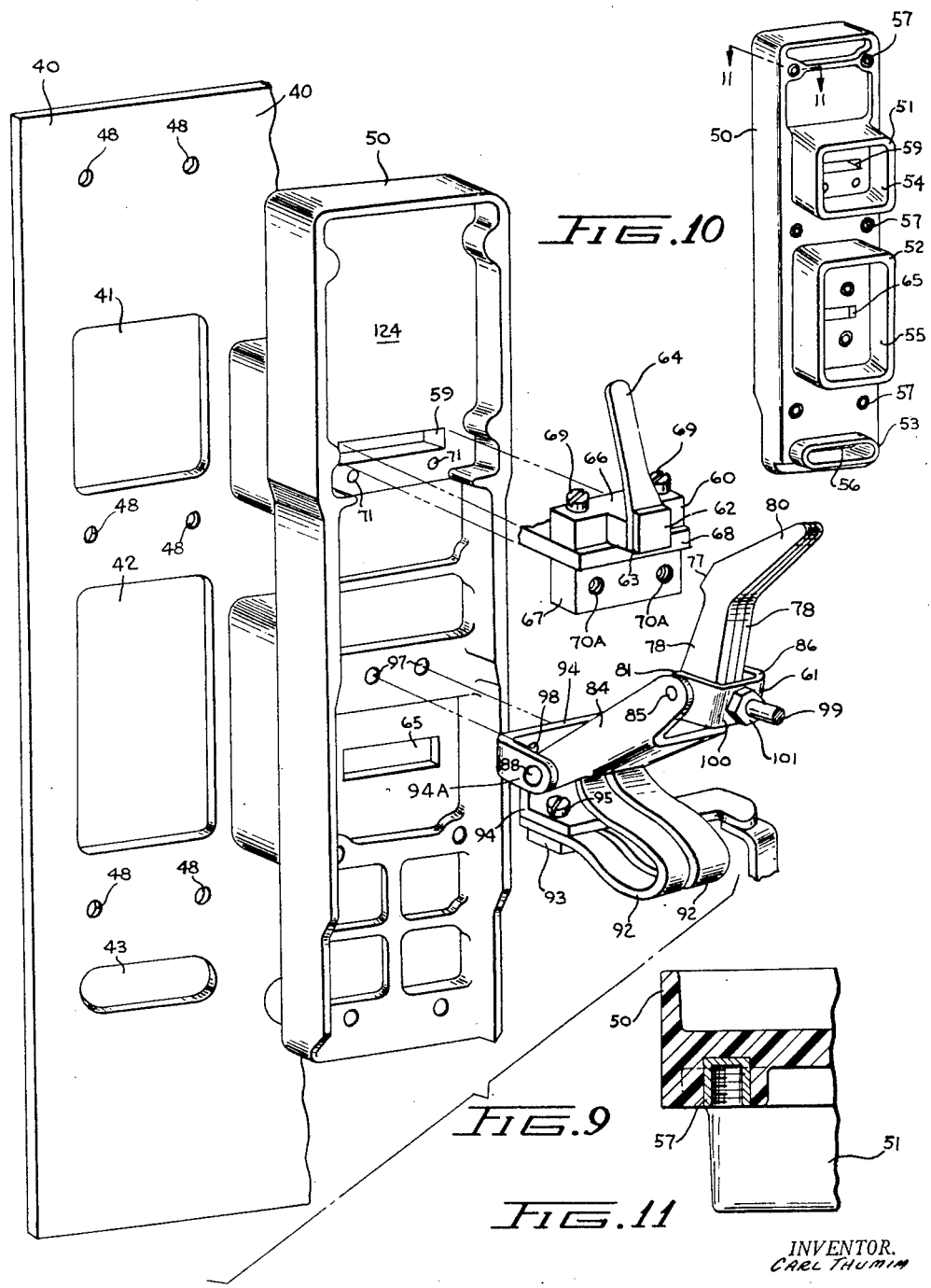

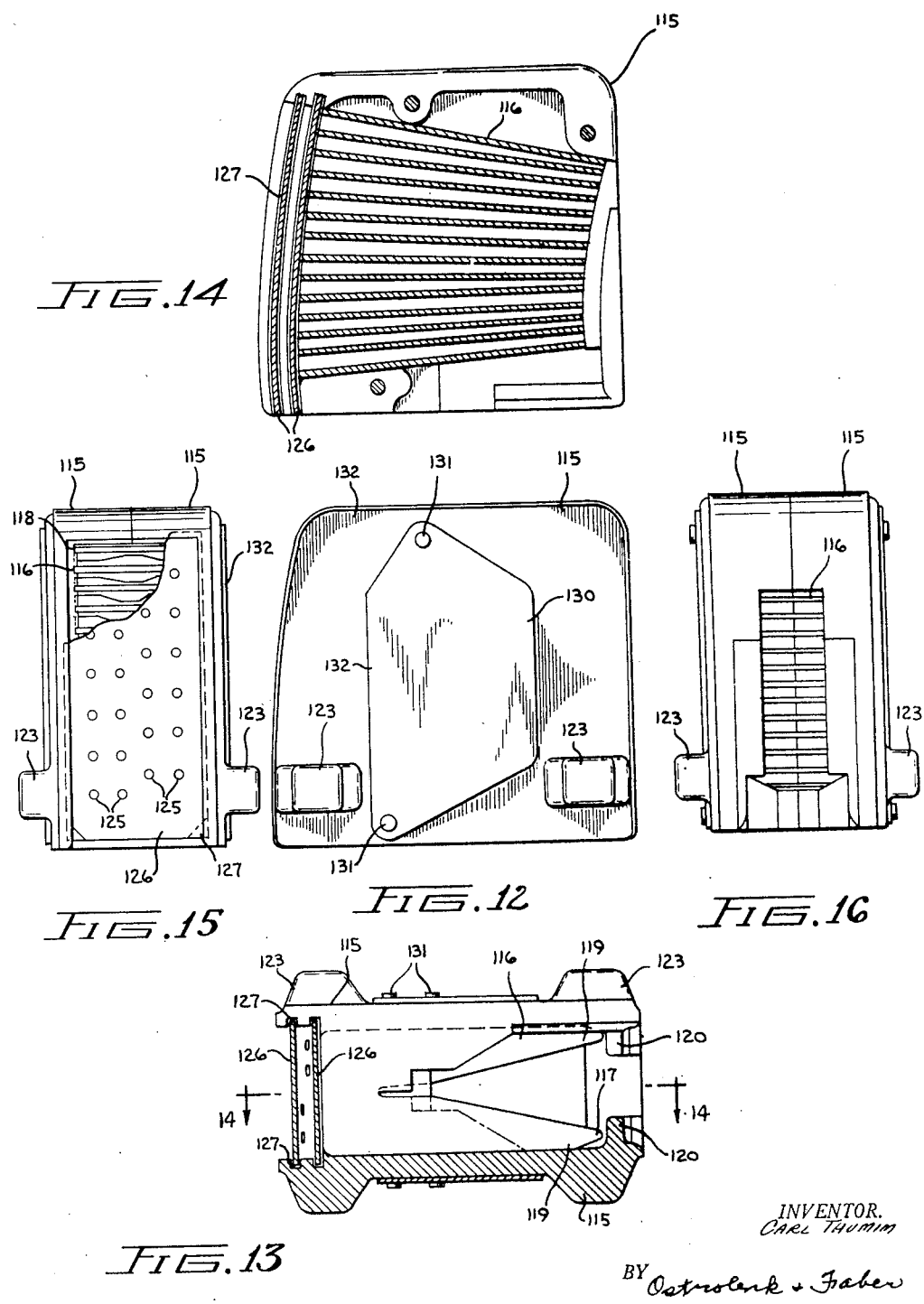

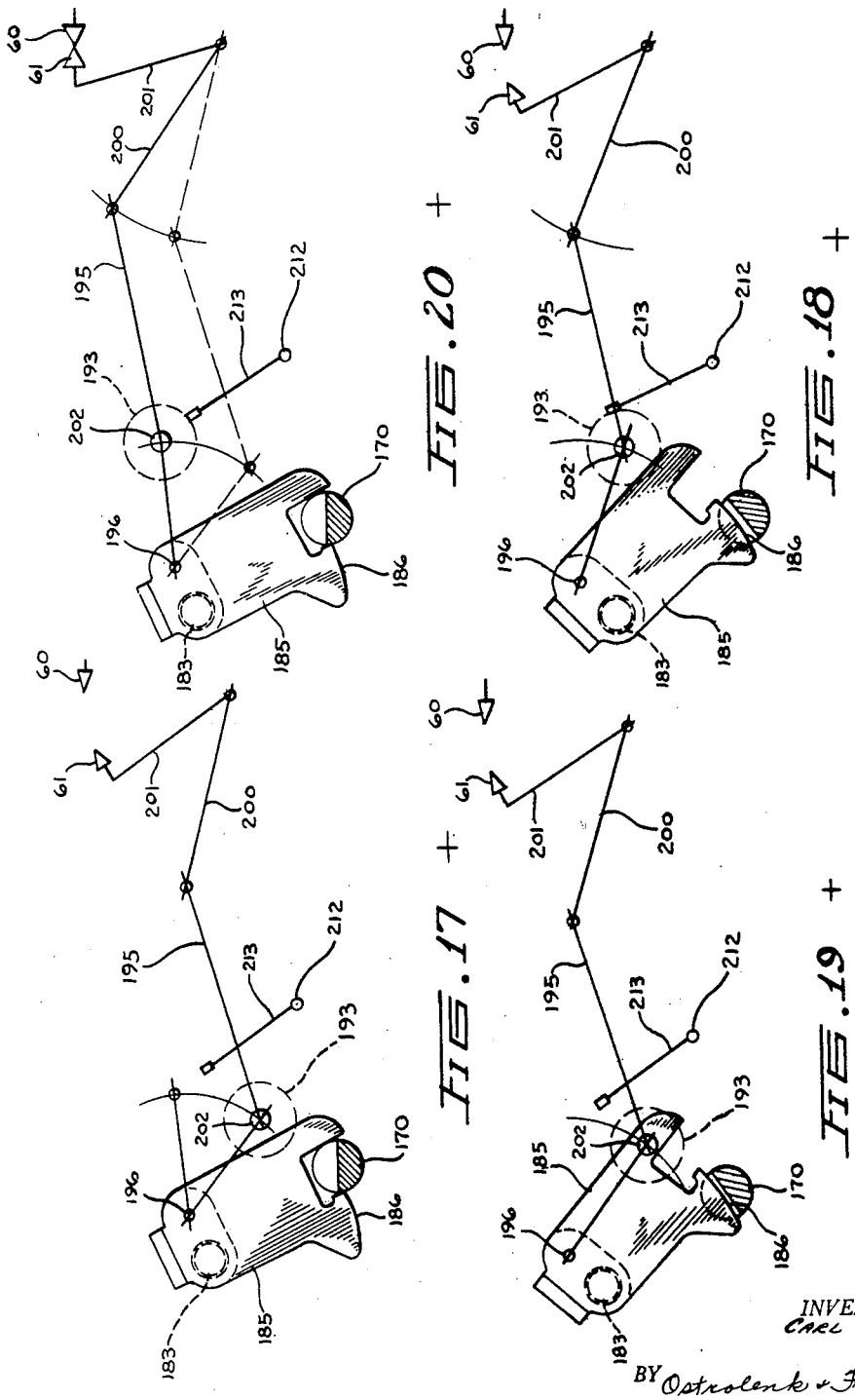

United States Patent Office 2,792,534
Patented May 14, 1957

2,792,534

SOLENOID CONTROL RELAY FOR CIRCUIT BREAKERS

Carl Thumim, Yeadon, Pa., assignor to I-T-E Circuit Breaker Company, Philadelphia, Pa., a corporation of Pennsylvania Application November 1, 1951, Serial No. 254,349

1 Claim. (Cl. 317—136)

The present invention relates to circuit breakers and more particularly to operating features of the components thereof.

The interruption of high currents involving relatively large amounts of power is a hazardous task to personnel and connected equipment unless it is performed under carefully defined conditions. The operator may be injured or killed by the failure of any one of several components of the breaker. Equipment may be extensively damaged by failure of the circuit breaker to properly perform its function.

Essentially, the novel safety features incorporated in the circuit breaker are in the escutcheon, the operating mechanism, the control relay and the arc chute. The combination of the novel operating features as incorporated in the circuit breaker and as described in the present application provide a very safe interrupter for high currents.

This circuit breaker is also so constructed that it may readily be operated in a closed steel compartment aligned with a multiplicity of other compartments in a switchboard in which the compartments are in close juxtaposition to each other.

It is then a primary object of the present invention to provide a novel and highly safe circuit breaker.

Still another object of this invention is the provision of a steel supporting panel for the parts of the circuit breaker.

A further object of the present invention is the provision of novel operating means for closing and tripping the circuit breaker.

A further object of the present invention is the provision of a novel control means for closing the circuit breaker.

The foregoing and many other objects of the present invention will become clear from the following description and the accompanying drawings, in which Figure 1 is a front view of the novel circuit breaker of the present invention with the front panel removed.

Figure 3 is a cross-sectional side view of the novel circuit breaker with the contacts open.

Figure 4 is a sectional view of part of the operating mechanism along line 4—4 in Figure 3.

Figure 5 is a sectional view along line 5—5 in Figure 3 of a portion of the operating mechanism of the circuit breaker of the present invention.

Figure 6 is a partial side cross-sectional view of the novel circuit breaker of the present invention with the contacts closed.

Figure 7 is a cross-sectional view through the arc chute of the circuit breaker of the present invention along 7—7 in Figure 3.

Figure 9 is an exploded view of the mounting of the contacts of the novel circuit breaker of the present invention.

Figure 10 is a pictorial view of the back of the base molding of the novel circuit breaker of the present invention.

Figure 11 is a partial sectional view along 11 of Figure 10.

Figure 12 is a side view of the novel arc chute assembly of the present invention.

Figure 13 is a bottom view of the novel arc chute assembly of the present invention.

Figure 14 is a sectional view along 14—14 of Figure 13.

Figure 15 is a front view of the novel arc chute of the present invention.

Figure 16 is a back view of the novel arc chute of the present invention.

Figure 17 is a schematic drawing of the novel operating mechanism of the present invention in the open position.

Figure 18 is a schematic drawing of the novel operating mechanism of the present invention in the trip position.

Figure 19 is a schematic drawing of the operating mechanism of the present invention in the collapsed position.

Figure 20 is a schematic drawing of the operating mechanism in the closed position.

Figure 2:
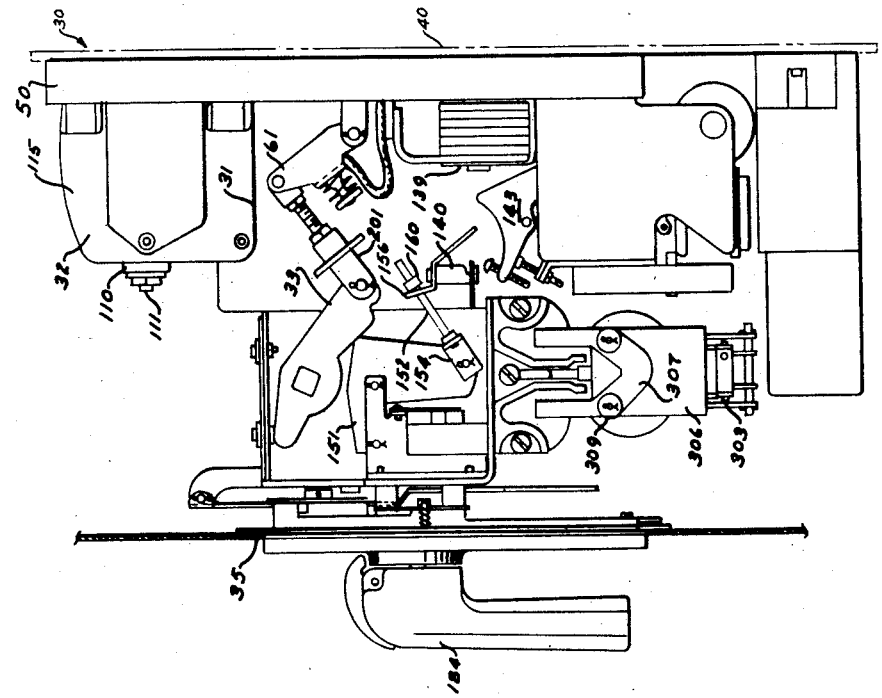
Figure 2 is a side view of the novel circuit breaker of the present invention.
Figure 1:
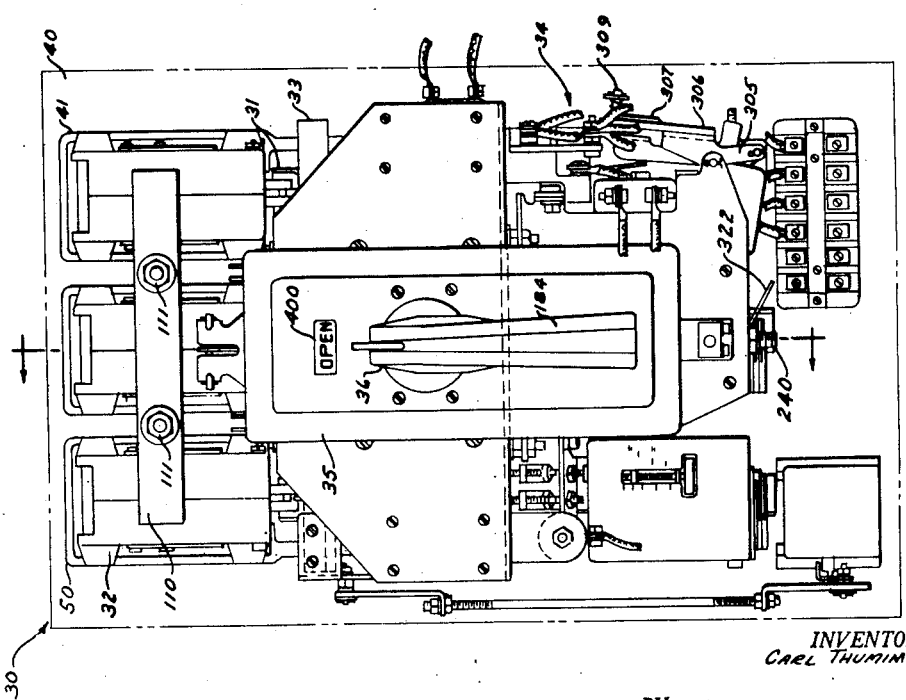

Referring now to Figures 1 and 2, there is here shown the novel circuit breaker 30 of my present invention. Circuit breaker 30 is composed of a plurality of unit assemblies which include the contact structure 31, the arc chute assemblies 32, the operating mechanism 33, control assembly 34, the escutcheon mounting assembly 35 and the trip unit 36.

The circuit breaker 30 as shown in these figures is a three pole circuit breaker in which three contact structures 31 and three arc chute assemblies 32 are provided. The contact structures 31 are provided with three stationary contacts and three movable contacts, as hereinafter described. One control assembly 34 is provided for the circuit breaker 30, the unit operating a plunger to close the circuit breaker, as hereinafter described. A single operating mechanism 33 is, however, provided which is used to close and open the circuit breaker contacts. The circuit breaker 30 is supported on a steel panel 40 a portion of which is shown more specifically in Figure 9.

The panel 40 is a flat steel plate provided with three openings 41. The three openings 41 are aligned horizontally adjacent the upper end of the steel panel 40 and are square shaped. The said openings 41 are provided to receive part of the base mouldings, hereinafter described with reference to Figures 9 and 10. Similarly, three rectangular shaped openings 42 are aligned horizontally in the central portion of panel or plate 40. These openings 42 are provided to receive another seating portion of the hereinafter described base mouldings. Still another three openings 43 aligned horizontally at the lower end of the plate 40 are provided which seat another series of protuberances of the base mouldings hereinafter described.

In appropriate cases, non-magnetic materials may be used for panel 40, such as non-magnetic steels, aluminum sheets, magnesium sheets, and any other physically strong non-magnetic material.

Smaller openings 48, hereinafter described, are in the steel panel 40 for the reception of various bolts and other securement means for securing the various assemblies and their supports rigidly to the steel panel.

An important feature of the present circuit breaker construction is in the use of a steel panel 40 which acts as part of an enclosure for the bus connections behind this steel panel. The construction of the steel panel 40 and circuit breaker mountings used in connection therewith is particularly adapted for low voltage circuit breakers, for 600 volts or below. In the past this type of breaker has been universally mounted on slate or ebony asbestos panels. In these designs the live parts of the breaker have been spaced on the insulating base so as to provide the proper creepage distance over the insulation. The use of a steel panel is possible only when the moldings are provided with flanges which increase the creepage distance between live parts and the steel panel which is grounded when in a switchgear assembly. By using flanges on the molding it is possible to mount the live parts relatively close together and still get adequate insulation.

The use of a steel panel has been dictated by the requirement that the panel be very much lighter than it was before, particularly on shipboard, where weight is important in the design. Steel is also stronger and not subject to breakage. It is particularly desirable where shock tests are required and breakage of insulating base has occurred. Moreover, steel is fireproof. Switchboard fires occurring in the past have resulted in the destruction of the insulating panels. The steel panel also provides a grounded metal barrier between the front of the breaker and whatever is at the rear.

The base molding 50 referred to above and as shown in Figures 9 and 10 is a single molded piece for each phase, or three pieces in all for three-pole circuit breakers. Figure 10 is the rear view of the base molding 50 showing protuberances 51, 52 and 53 which mate with openings 41, 42 and 43, respectively, of the steel plate 40. The protuberances 51, 52 and 53 are integral parts of base molding 50 and are hollow protuberances surrounding spaces 54, 55 and 56, respectively. The spaces 54, 55 and 56 are open facing the rear of base molding 50 as shown in Figure 10. Each base molding has six threaded inserts 57, two near the top, two between protuberances 51 and 52, and two between protuberances 52 and 53. When the base molding 50 is seated in steel plate 40, the reamed holes 48 of the steel plate 40 coincide with the threaded holes 57. Screws 58, shown in Figures 3 and 6, fit through holes 48 and thread holes 57, rigidly attaching the base molding 50 to the steel plate 40. The threaded holes 57 are shown more particularly with reference to Figure 11 which is a cross-sectional view through one of the holes 57. The spaces 54 and 55 have oblong openings 59 and 65 connecting them to the front as shown more particularly in reference to Figures 9 and 10.

The contact structure 31, referred to above in reference to Figures 1 and 2, is composed of a stationary contact assembly 60 and movable contacts assembly 61, as shown in Figure 9.

The stationary contact assembly 60 comprises a contact surface 62 which is welded at 63 to one end of the stationary arcing horn 64. Arcing horn 64 is welded to a copper block 66 which together with copper block 67 sandwiches copper plate 68. This assembly is held together by means of the two screws 69 which pass through bar 66 and plate 68 and thread block 67. Copper plate 68 fits into oblong opening 59 and is held rigidly in place by means of two screws 70 shown in Figures 3 and 6. Screws 70 pass through openings 71 in base molding 50 and thread the threaded holes 70A in block 67 as seen in Figure 9.

The copper plate 68 is additionally secured to the base molding 50 by means of an angle 72 as shown in Figure 3. The angle 72 is secured to the base molding 50 in space 54 by means of the screws 70 which pass through angle 72 and the base molding 50 threading the copper block 67 described above. The angle helps to rigidly secure copper plate 68 to the base molding 50 by means of a screw 73 which passes through the plate 68 and threads one side of the angle 72.

The connection is from the buses of the electrical system (not shown) to the three copper plates 68. The other connection to the buses is from copper plates 75. The copper plates 75, one for each pole, are connected through an overcurrent coil 139, hereinafter described, to the movable contacts 61.

Referring again to Figure 9, the movable contact assembly 61 has two coacting contacts 77. The contacts 77 are each welded to an arcing horn unit 78. Each movable contact 61 has two contact arms 78, each of which has a contact 77. Contact 77 makes contact to the stationary contact surface 62 of the stationary contact 60 in the closed position.

Each contact arm 78 has a tapered arcing horn 80 at its upper end, an opening 81 (not shown) near the center and an opening 82 (not shown) at the other end. The opening 81 holds a pin 85 which also penetrates two assembly brackets 84 and 86. The bracket 84 is pivoted at pin 88. The center of rotation of the movable contact is essentially about pin 88.

A small pin (not shown) fits into the openings 82 of the contact arm 78 and essentially holds spring 83, shown in Figures 3 and 6. The spring 83 is compressed against a button 90 which is held in place by positioner 91 which is also held in place by the small pin 83a through an opening at its bottom end. The compressed spring 83 essentially keeps a pressure upon the contact arm 78 which keeps the contacts 62 and 77 firmly together.

To aid in the contact pressure, the brackets 84 and 86 are joined together by plate 86a, which may be integral therewith. The plate 86a electromagnetically attracts the arcing horn unit about the pivots 87 and 83a to increase the contact pressure when current is flowing. The additional pressure is not exerted where current does not flow.

The end of the contact arm 78 has a multi-layered conductive strap 92 brazed to it. The other end of the straps 92 are rigidly held in place by a flange 93 which sandwiches the strap 92 against the angle 94. The angle 94 is held against flange 93 by means of two screws 95. The angle 94 is rigidly attached to the base molding 50 by means of two screws 96 as shown in Figure 3 and 6.

Figure 9 shows the reamed holes 97 in the base molding 50 through which the screws 96 enter and the threaded holes 98 in the angle 94 which are held by said screws 96. The angle 94 has two arms 94A each of which have an opening at one end bearing the pin 88 about which the moving contact 61 rotates.

The bracket 86, pivoted on pin 85, has a bolt 99 rigidly attached to its center 100. The bolt 99 is essentially the connecting rod between the contact arms 78 and the operating mechanism hereinafter described.

The flange 93 is brazed to one end of the overcurrent trip coil unit, as is also hereinafter described.

The arc chute assemblies 32 shown in Figures 1, 2, 3, and 6 and more particularly in Figures 12 through 16, one for each pole, are supported in position with respect to the stationary contact 60 by cross bar 110. The cross bar 110 fits across one side of the three arc chutes 32 and firmly affixes arc chute 32 to the base molding 50. The cross bar 110 is held firmly against the arc chutes 32 by means of two long studs 111. The long studs 111 pass between the arc chutes 32 to the base steel plate 40 and are firmly affixed to the base steel plate 40 by means of two nuts 112, shown in Figure 3. The nuts 112 are seated in two flanges 113 which run lengthwise along the base steel plate 40. Each flange 113 seats two studs similar to 111 and two screws, as is hereinafter described.

The arc chute assemblies 32 comprise two molded halves 115 which are rigidly attached to each other. The arc chute assemblies 32 also comprise a series of arc chute plates 116 which are fitted into slots 118. The slots 118 are part of the arc chute molded halves 115. The slots 118 are radial slots with respect to the base of the arc chute assemblies 32. The arc chute plates are V-shaped and are substantially parallel to the steel base 40 when mounted in position. The arc chute plates 116 comprise essentially two lower extensions 119 which are supported at one end 117 by a molded protrusion 120. This molded protrusion 120 protects the end 117 of the plates 116 from disintegration due to the arcing. Each arc chute has two molded protrusions 120 supporting the plates 116.

The arc chute assembly 32 has a plurality of arc chute plates 116, all of which are supported on the molded protrusions 120. The arc chute plates 116 are slipped into position through the open top of the joined two halves 115 of the arc chute assembly 32. The tolerances are fairly close so that the arc chute plates 116 do not have much play when seated in the slots 118. Each molded half has two external protuberances 123. These external protuberances 123 are used to support the arc chute assembly against the base molding 50. The protuberances 123 are near the lower end of the arc chute assembly, leaving approximately half an inch which enters into the open portion 124, as shown in Figure 9 of the base molding 50.

Back pressure of the arc gases is relieved by a plurality of openings 125 in arc chute insulating plates 126 and the arc gases escape through the spaces between the plates 116, which are open at the top. There are two insulating plates 126 for each arc chute assembly which fit into slots 127 which are in a plane approximately perpendicular to the plane of the plate 116. The slots 127 are half in each molded half 115. There is a slight bend to the insulating plate 126 which approximately follows the molded protrusion 120. The insulating plates 126 each comprise twenty-six openings 125. The openings 125 in each layer do not come directly above the openings of the other layer. In other words, the gases do not follow a straight path out of the top of the arc chute assemblies 32 but are dispersed by means of the non-linear path they are forced to traverse.

The arc chute assemblies 32 include two metal plates 130 which are preferably soft iron. The plates 130 are rigidly attached to the sides of the arc chute assemblies 32 by means of two bolts 131. The plates 130 serve to distribute the magnetic field of the arc effectively, particularly in the plates 116 in the front of the arc chute. The plates 130 are essentially a five-sided polygon with rounded corners, the longest side 132 being essentially parallel to the plates 126. The shape and disposition of these plates is the factor that effects the distribution of the flux of the arc, provides ears for fastening to chute by means of bolts 131 and still allows creepage distance between the front and back live parts.

The arc chute 32 is seen to be readily assembled and readily disassembled, as described above. The stamped metal plates fit into two molded halves 115 to make a very simple and effective assembly. The steel plates may be supplied either with a straight slot or may be supplied with staggered slots to increase the length of the arc path. The entire unit is easily and rapidly mounted to the circuit breaker base molding 50. When mounted, the arc chute 32 essentially covers the stationary contact assembly 60 and the contact 77 of movable contact 61.

The bolt 99 of movable contact 61 described above is connected to the operating mechanism 33. The operating mechanism as shown more specifically in the exploded view of Figure 8 comprises a bar 140 which is a steel bar running horizontally across the three base molding described above.

Under overcurrent condition, shown dotted in Figure 3, an energized coil 139 aided by a core 141 pulls an armature 142 against itself. The armature 142 comprises two units 143, seen also in Figure 8. The units 143 each have a screw 145 threaded at one end thereof and which is used to effect an adjustable contact with the initial tripping member 140. The head 144 of the screw 145 acts to rotate bar 140 upon the energizing of the coil 139 and hits extension plate 146 which is bolted to the shaft 140 described above. When the head 144 hits the end of the extension plate 146, the shaft 140 is caused to rotate in a counterclockwise manner looking from the right of the circuit breaker 30, which is the view of Figure 8.

The shaft 140 is also caused to rotate by means of a coil 150 which upon being energized pulls an armature member 151 to it. The member 151 has a link 152 rigidly attached to one end 153 of member 151 by means of an angle 154. The link 152 is attached to the angle 154 by means of a threaded portion 199 of link 152 which enters the angle 154 and a nut 148. The angle 154 is movably attached to the member 151 by means of a pin 155. A restoring spring 147 attached to the member 151 resets the armature upon de-energization of the coil 150.

The link 152 is attached to the shaft 140 by means of another angle 156. The angle 156 is attached to the shaft 140 by means of two bolts 158 and to the link 152 by means of a cap 160. The cap 160 is movably attached to the link to 152. Thus, the shaft 140 can now be caused to rotate by two methods, one due to the energization of the overcurrent trip coil 139 and the other due to the energizing of the coil 150. The coil 150 is remotely caused to be energized and is usually accomplished by manual operation of a remote pushbutton switch. The rotation of shaft 140 causes a link 162 to be moved by means of an angle 163 which is bolted to the shaft 140 by means of two bolts 164. The angle 163 has an identation 165 near the farthest edge 166 from the shaft 140. The link 162 has two slots 168 and 167. The slot 167 engages the indentation 165 of angle 163.

The translatory movement of link 162 causes the rotation of a milled shaft 170. The milled shaft 170 has another angle 171 rigidly attached to it by means of two bolts 172. This angle has an indentation 173 near the end 174 which is farthest from the shaft 170. The indentation 173 of angle 171 engages the slot 168 of link 162. Thus the rotation of shaft 140 causes the rotation of milled shaft 170.

When milled shaft 170 rotates to release a latch 177, as is hereinafter described, the circuit breaker movable contacts are allowed to be disengaged from the stationary contacts.

The angle 171 described above has an abutment 178. This abutment 178 is engaged by a roller 179 which is rotated manually by means of the closing handle 184 attached to the shaft 180. Shaft 180 has a crank 181 which is rigidly attached to the shaft 180 by means of a screw 182. The roller 179 is attached to one end of the crank 181. When the shaft 180 is rotated by the closing handle 184 the roller 179 engages abutment 178 of angle 171 and rotated milled shaft 170. Thus milled shaft 170 can be made to rotate by a plurality of methods. It can be made to rotate manually by means of closing handle 184; it can be made to rotate by means of an overcurrent condition in coil 139, as described above; and it can be made to rotate by means of an excitation of coil 150, as described above.

The latch 177 is an integral part of trip arm 185. The latch 177 engages the milled shaft 170 so that a small revolution of shaft 170 releases the latch 177, as hereinafter described. The shaft 170 is milled slightly past center at 186. The trip arm 185 is pivoted at 187 on a long pin 188. The pin 188 is also engaged on the trip arm extension 185A at point 183. The movable arm 190 is pivoted on pin 188 at points 191 and 192 and extends beneath a roller 193. The roller 193 is the pivot point of a toggle mechanism consisting of two links 194 and 195 and is carried by a pin 202 which pivots the meeting of links 194 and 195.

The links 194 and 195 each comprise two arms, 194A and 194B, and 195A and 195B, respectively. Arms 194A and 194B are pivoted on floating pin 196 and arms 195A and 195B are pivoted on pin 204.

The arms 194A and 194B support a rod 197 at 198 and 199, respectively. The rod 197 carries one end of a restoring spring 203 which is tensed by means of a stationary shaft 212, hereinafter described. The restoring spring 203 exerts a tension on the link 194 which tends to open or break the toggle mechanism. Link 194 is pivoted on a floating pin 196, which is supported by link arm 185 and its extension 189 being parallel to the pin 188. The other link 195 of the toggle is pivoted on movable link 200 which is connected by means of an adjustable insulator 201 to the movable contact assembly 61 described above. When the toggle mechanism consisting of links 194 and 195 is straightened out by means hereinafter described, pressure is put on movable link 200 by means of link 195 and bearing pin 204. The movable link 200 is pinned to insulator 201 by a pin 205 and moves so as to advance the insulator 201 and the movable contacts 61 towards the stationary contact 60.

Figure 8:
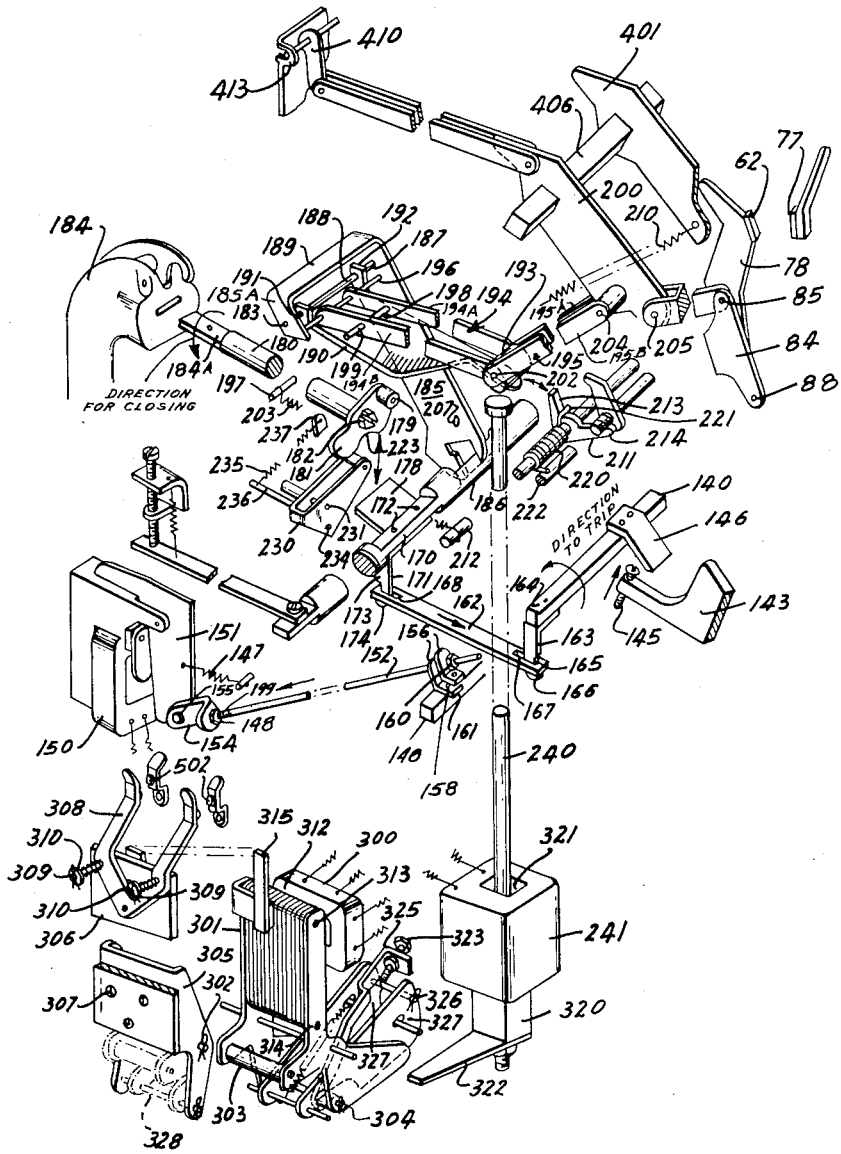
Figure 8 is an exploded view in perspective of the operating mechanism of the novel circuit breaker of the present invention.

In the exploded view shown in Figure 8 the contacts are open and the toggle mechanism consisting of links 194 and 195 is collapsed. The circuit breaker may be closed by a variety of methods. The circuit can be closed manually by means of shaft 180 rotated by closing handle 184 described above. If shaft 180 is rotated in the direction indicated by the arrow 184A, the roller 179 will engage the bottom of arm 190 and force the arm 190 against roller 193, thus straightening out the toggle mechanism and closing the circuit breaker contacts.

The movable links 200 are under an opening tension by means of opening spring 210 so that if no additional locking action other than described above for supporting the toggle existed, the circuit breaker would re-open immediately upon releasing the shaft 180. The locking device is supplied by means of a crank 211 which is located on a shaft 212 mentioned above, whose longitudinal axis is parallel to the axis of the milled shaft 170 and the rod 140. The crank 211 has two arms 213 and 214. The arm 213 is located, when the circuit breaker is open, adjacent the roller 193. When the roller 193 is forced upward, as due to the pressure of arm 190, the roller pushes against arm 213 of crank 211, rotating the crank 211 slightly on shaft 212. When the roller 193 has cleared the top of arm 213, the arm 213 snaps underneath the roller 193 due to the compression of a spring 220. The spring 220 which is wound on the shaft 212 has one end on an indentation 221 of crank 211 and the other end borne against a shaft 222 which pierces the trip arm 185. The shafts 212 and 222 have been moved out of position in the exploded view for the sake of clarity. Actually the shaft 222 pierces the trip arm 185 at point 207. The longitudinal axis of shaft 222 is essentially parallel to the longitudinal axis of shaft 212 and milled shaft 170.

When the roller 193 is moved, straightening the toggle, it causes crank 211 to rotate compressing spring 220. The roller clears the top of arm 213 letting the crank rotate in the opposite direction until the arm 213 is directly beneath and supporting the roller 193. The other arm 214 or crank 211 bears against the shaft 222 preventing further rotation of the crank 211 so that the arm 213 is stopped directly beneath the roller 193. The spring 220 is under compression normally so that the arm 214 is constantly bearing against the shaft 222. When the toggle is straightened, the rotation of the crank 211 moves the arm 214 away from the shaft 222 until the roller 193 clears the top of arm 213. Then the reverse rotation of the crank 211 occurs until the arm 214 again bears against shaft 212.

Thus, when the toggle is straightened and the circuit breaker closed, the crank 211 locks the toggle and thus locks the circuit breaker in a closed position.

The closing handle 184 by means of the shaft 180, after closing the circuit breaker by means of the rotation of roller 179 against the arm 190, as described above, is returned to its normal position by means of a crank 230. The crank 230 is pivoted on a stationary pin 231.

The crank 181 described above has an indentation 232 which meets a roller 233 of crank 230. The crank 230 supports a pin 234 which has a restraining spring 235 engaged at one end 236. The restraining spring 235 is attached to an angle 237 and is tensed on the pin 236, causing the crank 230 to rotate. The rotation of crank 230 causes the roller 233 to meet the indentation 232 returning the crank 181 to its normal position.

The circuit breaker may also be closed by means of a plunger 240 shown also in Figures 3 and 5. The plunger 240 is part of the core of a solenoid coil 241. A remote signal energizes the coil 241 and causes the plunger extension 240 to push against the roller 193 in a similar manner as the arm 190. The roller 193 is a cylinder and has the arm 190 meet it on one half and the plunger extension 240 meet it at the other half. The plunger extension 240 raises the roller 193 straightening out the toggle mechanism and closing the circuit breaker with the locking action due to crank 211 similarly as described in reference to the manual closing of the circuit breaker.

The closing solenoid 241 is energized from a remote point in the following manner.

Figure 25:
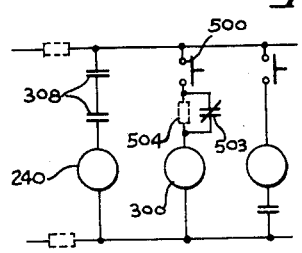
Figure 25 is a wiring diagram of the novel control relay of the present invention.

When the circuit breaker is desired to be closed from a remote point, a button 500 in Figure 25 is depressed which energizes the relay coil 300. The energized coil 300 acts as an electromagnet and attracts the movable armature 301, shown in Figure 8. The movable member 301 is pivoted in three places by pins 302, 303 and 304. The pin 302 is a fixed pivot but the other two pins, 303 and 304, are floating pivots. The pin 302 also supports an extension 305 of a movable bracket 306. The extension 305 is secured to the bracket 306 by means of three screws 307. The bracket 306 carries at one end the extension 305 and at the other end a V-shaped contact 308. The contact 308 is movably connected to bracket 306 by means of two pins 309. The pins 309 are movable with respect to the bracket 306 and the contact 308. The bracket 306 and the contact 308 are held together by means of the springs 310 supported against the top of the pins 309. The contracted springs 310 force the contact 308 against the bracket 306.

The movable member 301 has a laminated armature 312. The laminated armature 312 is rigidly attached to the member 301 by means of force fit pins 313 and 314. The movable member 301 has also as an integral part thereof an angle, not shown, which bears a dielectric rectangular strip 315.

Once coil 300 is energized, the movable member 301 carrying the bracket 306 is locked against coil 300, as is hereinafter described, obviating the further energization of coil 300. Thus, touching the remote button, not shown, but briefly, is sufficient to lock the mechanism described against the coil 300.

When coil 300 is energized, it energizes in turn closing solenoid coil 241 described above, causing the plunger extension 240 to move against the roller 193. The plunger extension 240 carries at its distal end a cross-sectionally square core 320 which slides with opening member 322. As the plunger completes the closing of the circuit breaker by means of pushing roller 193 onto arm 213, as described above, the member 322 engages the head 323 of a screw 324. The screw 324 is carried by a link 325, which is pivoted on a floating pin 304 of the movable member 301.

The link 325 normally rests against a pin 326 carried at one end of a tray-like member 327. The member 327 is pivoted at its other end on a floating pin 328 which also pivots the end of the extension 305 described above. Pin 303 and pin 328 carry springs not shown which are tensed to pin 326.

The control relay, as described above, maintains the relay contact 308 in a substantially latched position with the armature 301 under normal conditions. Upon energization of the coil 300, the armature 301 moves to its closed position carrying the contact 308 with it. The engagement of the movable relay contact 308 with the stationary relay contacts 502 shown in Figure 8 establishes the circuit of the closing solenoid 241.

Referring again to the circuit diagram as shown in Figure 25, the closing of the remote switch 500 energizes the coil 300 through the normally closed contacts 503 and resistor 504. The energization of coil 300 energizes coil 241 and closes the contacts 308 and 502 described above.

When the head 323 is hit by member 322 the mechanism shifts, causing the opening of the circuit, deactivating coils 300 and 241. The closing solenoid plunger 240 will open the latch engagement between the relay armature 301 and the relay contacts 308 when the closing solenoid plunger 240 nears its completion of the closing stroke. This allows the closing solenoid 300 electrical circuit to be interrupted when the circuit breaker 30 is securely latched in the closed position. As long as the relay operating switch 500 is held in the closed position, the relay operating coil 300 will hold the relay armature 301 in sealed position while the relay contacts 308 remain in the open position. The relay armature 301 and the relay contacts 308 cannot relatch until the relay closing switch 500 is released. This operating characteristic makes the relay trip free. Continuous "pumping" of the circuit breaker closing mechanism is thus prevented using a maintained contact close switch under conditions when a fault remains on the circuit or where defective closing mechanism causes defecting latching.

The various positions of the operating mechanism are shown in Figures 17 through 20.

Figure 20 shows the closed position thereof, with link 311 pushed forward to raise the crank 200 and close the contact arm or insulator 201 and with the roller 193 on the arm or abutment 213.

The latch arm 185 is shown in appropriate latching engagement with the milled shaft 170.

When the shaft 180 described above is turned to release the mechanism, the condition as shown in Figure 19 results.

On the occurrence of tripping conditions the milled shaft 170 is rotated to permit the latch arm 185 to move into the milled section of position 186 of the milled shaft 170 as seen in Figure 18.

Then as seen in Figure 19 the roller 193 drops off the abutment 213 to open the circuit breaker.

Thereafter as seen in Figure 20, the latch arm 185 is restored to its initial position and the milled shaft 170 is restored to latching position so that the circuit breaker may again be moved from the open position of Figure 17 to the closed position of Figure 20.

The closing handle 184 returns to its neutral position shown in Figure 22 automatically after tripping or closing the contacts unless it is latched as is hereinafter described. It becomes important to provide for some indication preferably visual of the contact position.

An external indication as to whether the circuit breaker 30 is open or closed is provided above the closing handle 184 by means of visual indicator 400 shown in Figures 3, 6, 21, 22 and 24. The visual indicator 400 is directly driven as is hereafter described by the movement of the links 200 described above which moves whenever the circuit breaker 30 opens or closes.

Referring now to Figures 3 and 6, the end 401 of the link 200 has two holes 402. The link 200 by means of the screws 403 and the nuts 404 through the holes 402 support the plates 405. The link 200 rotates on the bar 406 which is partially rectangular and partially circular in cross-sectioned shape. The rectangular cross-sectional shape of the bar 406 passes through the opening 407 of the link 200 and circular portion of the bar 406 is supported on the housing 408 of the circuit breaker 30. Thus, the bar 406 rotates easily in its supports on the housing 408 carrying with it the links 200 without any slippage.

The plate 405 carries a pin 406 which moves essentially up or down dependent upon whether the circuit breaker is opening or closing, respectively. The pin 409 engages a link 410 through the opening 411. The link 410 carries a pin 412 at its other end which is supported on a sliding member 413. Sliding member 413 has attached to it a spring 414. The other end of the spring 414 is attached to the indicator-carrier 415. The carrier 415 has the two words "Open" and "Closed" at 417. The other end of the indicator-carrier 415 is provided with a notch 416 which pivots on the pin 417. The movement of the words "Open" and "Closed" at 416 and 417 is then a circular motion. The front face 418 is spherically shaped. The spherical shape of the face 418 allows good visibility from the sides, top and bottom.

The visual design as described above is directly driven through the links 200, the arms 405, the link 410, and the sliding member 14 and is thus independent of operation by means of a spring whose failure is the usual cause of a false indication.

Figures 23, 24:
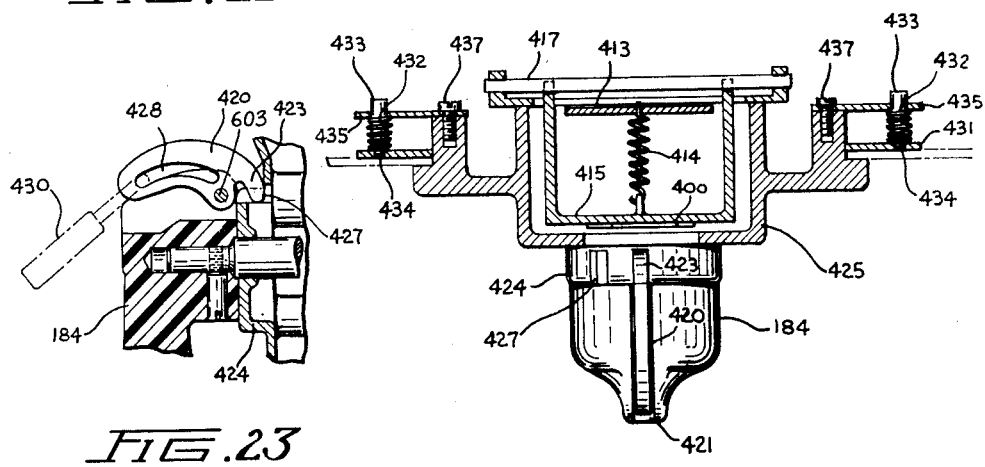
Figure 23 is a sectional view along lines 23—23 in Figure 21.
Figure 24 is a sectional view along 24—24 in Figure 22.

The closing handle 184 is provided with a locking bar 420 shown particularly in Figures 3 and 23. The top of the handle 184 is slotted at 421 to receive the locking bar 420 pivotally mounted upon the pin 603. A suitable spring may be provided if so desired to bias the locking bar 420.

The present modification operates the bar 420 gravitationally so that the locking tip 423 presses against the circular platform 424 of the escutcheon plate 425. The platform 424 has a notch or slot 427 shown in Figures 23 and 24.

Figures 21, 22:
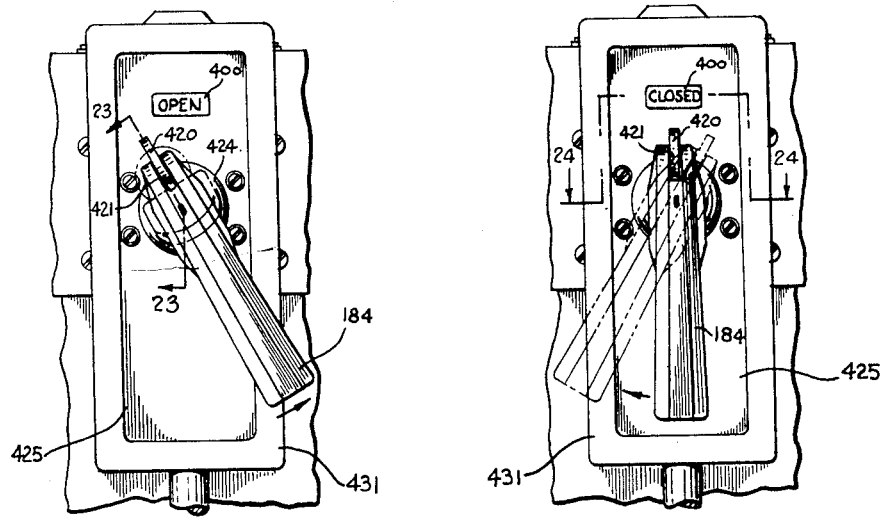
Figure 21 is a front view of the novel escutcheon of the present invention in the open position.
Figure 22 is a front view of the novel escutcheon of the present invention in the closed position.

Rotation of the closing handle 184 in a counterclockwise direction with respect to Figures 21 and 22 will cause the locking bar 420 to be rotated to such a position that the locking tip 423 will enter the notch 427. As long as the tip 423 is seated in the notch 427, the circuit breaker 30 cannot be closed. The locking bar 420 is provided with a slot 428 having a sufficient width to permit the passing of a hasp of a padlock 430 (Figure 23) therethrough. This is an important safety factor in the use of the present circuit breaker as unauthorized personnel are thus restrained from closing the breaker.

The handle 184 is seated against the circular portion 424 described above which is an integral part of the escutcheon 425. The escutcheon 425 and the handle 184 are the only portions of the circuit breaker which can be viewed by the operator. The escutcheon has a self-aligning plate 431. As shown particularly in Figure 24, the plate 431 is aligned by means of two springs 432 which are coiled on the sliding pins 433. The pins 433 are fixed to the plate 431 at 434 and slide through the bars 435. The bars 435 are held rigidly in place against the back of the escutcheon 425 by means of screws 437.

The escutcheon plate 431 is then self-aligning in that any reasonable deviation in its alignment with the front hinged enclosure 440, shown in Figures 3 and 6, is automatically compensated for by the design. The design provides a safety factor in that gas pressures originated inside the circuit breaker enclosure tend to establish a sealing effect by forcing the escutcheon plate 431 against the cover 440 and thus preventing exposure of the operator to dangerous flare-ups.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claim.

What is claimed is:

Control means for the automatic closing of a circuit interrupter comprising a relay device and a closing device; said relay device having a coil, a pivoted armature and a pivoted switching means; said armature and said switching means pivoted on a common axis; said armature having a linkage means, said linkage means operatively connecting said piovted switching means to said pivoted armature, said relay coil effective to simultaneously rotate said switching means and said armature from a first to second position when energized; said closing device having a coil and a plunger; said switching means closing an electrical circuit to said closing coil when moved from said first to said second position to thereby effect energization of said closing coil, energization of said closing coil effective to move said plunger from a first to a second position, said plunger operatively connected to said linkage means when moved to said second position, said linkage means disconnected from said switching means to permit said last mentioned means to move from said second position to said first position when said plunger is moved to said second position, said linkage means when moved by said plunger effective to permit said switching means to move from said second position to said first position without disturbing said armature.

References Cited in the file of this patent

UNITED STATES PATENTS

| | | |
|---|---|---|
| 2,065,443 | Frese | Dec. 22, 1936 |
| 2,349,647 | Boisseau | May 23, 1944 |
| 2,534,115 | Favre | Dec. 12, 1950 |
| 2,748,221 | Edwards | May 29, 1956 |